United States Patent
Myhre et al.

(10) Patent No.: US 10,638,405 B2
(45) Date of Patent: Apr. 28, 2020

(54) ACCESS CONTROL IN A NETWORK COMPRISING NETWORK SLICES

(71) Applicant: Telefonaktiebolaget LM Ericsson (publ), Stockholm (SE)

(72) Inventors: Elena Myhre, Järfälla (SE); Icaro L. J. da Silva, Solna (SE); Paul Schliwa-Bertling, Ljungsbro (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/061,779

(22) PCT Filed: Jan. 5, 2017

(86) PCT No.: PCT/SE2017/050010
§ 371 (c)(1),
(2) Date: Jun. 13, 2018

(87) PCT Pub. No.: WO2017/119844
PCT Pub. Date: Jul. 13, 2017

(65) Prior Publication Data
US 2018/0376407 A1    Dec. 27, 2018

Related U.S. Application Data

(60) Provisional application No. 62/276,396, filed on Jan. 8, 2016.

(51) Int. Cl.
| | | |
|---|---|---|
| H04L 12/26 | (2006.01) | |
| H04W 48/08 | (2009.01) | |
| H04W 48/02 | (2009.01) | |
| H04W 16/00 | (2009.01) | |
| H04W 48/12 | (2009.01) | |
| H04W 84/00 | (2009.01) | |
| H04W 76/27 | (2018.01) | |
| H04W 48/16 | (2009.01) | |
| H04W 74/08 | (2009.01) | |

(52) U.S. Cl.
CPC .......... *H04W 48/08* (2013.01); *H04W 16/00* (2013.01); *H04W 48/02* (2013.01); *H04W 48/12* (2013.01); *H04W 48/16* (2013.01); *H04W 74/0833* (2013.01); *H04W 76/27* (2018.02); *H04W 84/00* (2013.01)

(58) Field of Classification Search
CPC ..... H04W 76/27; H04W 48/08; H04W 48/16; H04W 84/00; H04W 16/00; H04W 48/02; H04W 48/12; H04W 74/0833
USPC ......................................................... 370/230
See application file for complete search history.

(56) References Cited

U.S. PATENT DOCUMENTS

| | | | |
|---|---|---|---|
| 2014/0161026 A1* | 6/2014 | Stojanovski | H04L 45/22 370/328 |
| 2014/0269295 A1 | 9/2014 | Anumala | |
| 2016/0255571 A1* | 9/2016 | Yan | H04W 48/16 455/434 |

OTHER PUBLICATIONS

LG, "Consideration on network slice in NR", Oct. 10-14, 2016 (Year: 2016).*

(Continued)

*Primary Examiner* — Mang Hang Yeung
(74) *Attorney, Agent, or Firm* — Coats & Bennett, PLLC

(57) ABSTRACT

A method to enable network slice aware access control in a wireless communication system. In some embodiments, the method includes adding network slice configuration information (NSCI) to the system information (SI) (e.g., System Information Block (SIB)) that is broadcast over the air interface (e.g. the LTE/NX air interface).

11 Claims, 20 Drawing Sheets

(56) References Cited

OTHER PUBLICATIONS

NGMN Alliance, "5G White Paper—Executive Version by NGMN Alliance", Dec. 22, 2014, pp. 1-20, Version 1.0, Frankfurt, Germany.
Nokia et al., "RACH isolation for Slices", Discussion and Decision, 3GPP TSG-RAN WG2 Meeting #96, Reno, USA, Nov. 14, 2016, pp. 1-3, R2-168258.
Zte, "Feasibility Study on Core Network Slicing", SA WG2 Meeting #S2-110, Jul. 6, 2015, pp. 1-4, Dubrovnik, Coatia, S2-152363.
Hattachi, R. et al. "A Deliverable by the NGMN Alliance; 5G White Paper", Feb. 17, 2015, pp. 1-125, version 1.0, Frankfurt, Germany.
Ericsson, 5G Systems, Ericsson White Paper, Jan. 1, 2015, pp. 1-14, Ericsson AB, retrieved from internet: web. mchive_org/web/20151012184616/http://www_ericsson_com/res/docs/whitepapers/what-is-a-5g-system.pdf.
Ericsson, "The Real-Time Cloud", Ericsson White Paper, Feb. 1, 2014, pp. 1-11, Ericsson AB, retrieved from Internet: web.archive.org/web/20140309031847/http://www.ericsson.com/res/docs/whitepapers/wp-sdn-and-cloud.pdf.
3rd Generation Partneship Project, "3rd Generation Partnership Project; Technical Specification Group GSM/EDGE Radio Access Network; Cellular System Support for Ultra Low Complexity and Low Throughput Internet of Things; (Release 13)", Technical Report, 3GPP TR 45.820 V1.3.1, Jun. 1, 2015, pp. 1-271, 3GPP, France.
3rd Generation Partneship Project, "3rd Generation Partnership Project; Technical Specification Group Core Network and Terminals; Non-Access-Stratum (NAS) protocol for Evolved Packet System (EPS); Stage 3 (Release 11)", Technical Specification, 3GPP TS 24.301 V11.5.0, Dec. 1, 2012, pp. 1-344, 3GPP, France.

* cited by examiner

ACCESS CONTROL IN A NETWORK COMPRISING NETWORK SLICES

TECHNICAL FIELD

Aspects of this disclosure relate to access control in a network comprising network slices.

BACKGROUND

A digital transformation, brought about through the power of connectivity, is taking place in almost every industry. Through an unprecedented ability to share information, people and industries are collaborating more, creating solutions that combine many different areas of expertise and overturning traditional business models. But the pressure on the networks that provide this connectivity is palpable. For that reason, a new system (the "5G system") will be built to enable logical network slices, which will enable operators to provide networks on an as-a-service basis and meet the wide range of expected use cases. See e.g., "5G White Paper," by the NGMN Alliance (available at web.archive.org/web/20150319062242/http://www.ngmn.org/uploads/media/NGMN_5G_White_Paper_V1_0.pdf); see also Ericsson, "5G Systems White Paper," January 2015 (available at web.archive.org/web/20151012184616/http://www.ericsson.com/res/docs/whitepapers/what-is-a-5g-system.pdf); and Ericsson, "The Real-Time Cloud White Paper", February 2014 (available at web.archive.org/web/20140309031847/http://www.ericsson.com/res/docs/whitepapers/wp-sdn-and-cloud.pdf)

Traditional, one-size-fits-all network architectures with purpose-built systems for support and IT worked well for single-service subscriber networks with predictable traffic and growth. However, the resulting vertical architecture has made it difficult to scale telecom networks, adapt to changing subscriber demands and meet the requirements of emerging use cases. Cloud technologies together with software-defined networking (SDN) and Network Functions Virtualization (NFV) provide the tools that enable architects to build systems with a greater degree of abstraction, which enhances network flexibility. Cloud, SDN and NFV technologies allow vertical systems to be broken apart into building blocks, resulting in a horizontal network architecture that can be chained together—both programmatically and virtually—to suit the services being offered and scaled. In 5G systems, networks will be further abstracted into network slices: a connectivity service defined by a number of customizable software-defined functions that govern geographical coverage area, duration, capacity, speed, latency, robustness, security and availability.

SUMMARY

In some environments, it is important to provide protection mechanisms so one network slice does not interfere directly with another. It is currently not possible to differentiate accesses depending on the network slice(s) to which a wireless communication device (WCD) attempts to connect due to the fact that information about slicing and relevant slices is not defined in existing specifications, nor is WCD behavior or network behavior differentiated depending on network slice(s). Network slicing is a business expansion enabler, and it does not necessarily map to a specific service or a specific access class or application group, which are the differentiation criteria on which access control is built today.

With the adoption of network slicing, it will be possible that two (or more) different slices contain all the services, which exist today, but there will still be the need to differentiate access as two (or more) slices represent different service level agreements (SLAs). At the same time, due to the resulting signaling overhead, it is an increasing problem that more and more information has been added to the System Information Broadcast (SIB) mechanism over subsequent 3GPP releases, hence any solution to this problem needs also to consider how to introduce the differentiation when it comes to the way to code the information and signal it over the radio interface.

Accordingly, this disclosure describes, among other things, a method to enable network slice aware access control in a wireless communication system (e.g., LTE/NX system (or 5G RAN, more generally speaking)). In some embodiments, the method includes adding network slice configuration information (NSCI) to the system information (SI) (e.g., System Information Block (SIB)) that is broadcast over the air interface (e.g. the LTE/NX air interface). In another embodiment, the NSCI is transmitted over the air using dedicated signaling. In other embodiments, the NSCI is transmitted using a combination of broadcast signaling and dedicated signaling. In other embodiments, some NSCI is transmitted via broadcast signaling and dedicated signaling and additional NSCI is defined offline (i.e. defined in the specifications, but never transmitted over the air interface) or via a combination of broadcast and dedicated information (e.g. all configurations obtained dedicated and a system signature index provided in common channels). This enables the network to communicate to WCDs served by the network information identifying the list of the network slices that are supported in the area (e.g., the cell) in which the WCD is located at any given time as well as the barring status (e.g., barring level) for each such network slice.

In one embodiment, the overhead issue created in the case the NSCI is broadcast is mitigated by creating a hierarchy of network slices, so that slices can be grouped in types that can be defined by a reasonable amount of bits. For example, the NSCI that is broadcast may merely include one or more network slice group identifiers (group IDs), where each such group ID identifies a set of one or more network slices. Additionally, in such a scenario the NSCI may further include a barring status for each group ID.

The issue of network slice information exposure (operators would not want to advertise explicitly which slices they support in which node/area) can be solved by hashing the values, which may also reduce signaling overhead for the embodiments where the NSCI is broadcast.

In one aspect, there is provided a node element, NE, for providing network slice information. In one embodiment, the NE comprises: (1) a receive module for receiving from a network management node configuration information concerning at least one of: i) a set of two or more network slices supported by the NE and ii) a set of two or more network slice groups supported by the NE; and (2) a transmit module for transmitting, after receiving the configuration information, network slice configuration information, NSCI, the NSCI comprising at least one of: i) for each supported network slice, information for identifying the network slice and information identifying a barring status of the network slice, ii) for each supported network slice group, information for identifying the network slice group and information identifying a barring status for the network slice group, and iii) for each supported network slice group that is barred, information for identifying the barred network slice group.

In another embodiment, the NE comprises: (1) a first generating module for generating first system information (e.g., an AIT or part of an AIT) comprising a first plurality of entries, the first system information corresponding to the first network slice; (2) a first transmitting module for transmitting, to a first WCD configured to use the first network slice, the first system information; (3) a second generating module for generating second system information (e.g., an AIT or part of an AIT) comprising a second plurality of entries, the second system information corresponding to the second network slice; (4) a second transmitting module for transmitting (e.g., via dedicated signaling), to a second WCD configured to use the second network slice, the second system information; and (5) a broadcasting module for broadcasting within the cell an index (e.g., SSI) that identifies an entry in the first and second plurality of entries. The first WCD is configured to use the index to retrieve from the first plurality of entries the entry identified by the index, wherein the entry identifies a barring status (e.g., barring level) of the first network slice. And the second WCD is configured to use the index to retrieve from the second plurality of entries the entry identified by the index, wherein the entry identifies a barring status (e.g., barring level) of the second network slice.

In another embodiment, the NE comprises: (1) a detecting module for detecting that a first WCD has used a first random access channel, RACH, to transmit a request for system information, wherein the first RACH corresponds to a first network slice; (2) a determining module for determining whether the first network slice is not barred in response to detecting that the first WCD has used the first RACH to transmit the request for system information; and (3) a transmitting module for transmitting a response to the request as a result of determining that the first network slice is not barred. In some embodiments, the transmitting module for transmitting the response transmits the response by broadcasting system information concerning the first network slice (e.g., information identifying a barring level of the first network slice).

In another embodiment, the NE comprises: (1) a first transmitting module for transmitting system information for informing WCDs located within a cell served by the NE that a first set of one or more bits of a bit string corresponds to a first network slice and a second set of one or more bits of the bit string corresponds to a second network slice; and (2) a second transmitting module for transmitting the bit string. The first set of bits of the bit string identifies a barring status of the first network slice. The second set of bits of the bit string identifies a barring status of the second network slice. And the first set of bits is different than the second set of bits.

In one aspect, there is provided a WCD for discovering whether a network slice that the WCD is authorized to use is supported and not barred. In one embodiment, the WCD comprises: (1) a searching module for searching for system information (e.g., a SIB) that is being broadcast by an NE serving an area in which the WCD is located; (2) a receiving module for receiving the system information; (3) a locating module for locating network slice configuration information, NSCI, within the system information, wherein the NSCI identifies at least one of: i) a set of supported network slices and the barring status of each supported network slice and ii) a set of supported network slice groups and the barring status of each supported network slice group; and (4) a determining module for determining, based on the broadcast NSCI and locally stored configuration information identifying authorized network slices, whether any of the authorized network slices are supported and not barred.

In another embodiment, the WCD comprises: (1) a first receiving module for receiving (e.g., via dedicated signaling) system information comprising a plurality of entries, wherein the system information corresponds to one of the WCD's authorized network slices; (2) a second receiving module for receiving an index (e.g., SSI) that identifies an entry in the plurality of entries; (3) a retrieving module for using the index to retrieve from the plurality of entries the entry identified by the index, wherein the retrieved entry identifies a barring status (e.g., barring level) of the authorized network slice; and (4) a determining module for determining whether the authorized network slice is barred based on the barring status information.

In another embodiment, the WCD comprises: (1) a transmitting module for transmitting, using a predetermined RACH, a request for system information, wherein the predetermined RACH corresponds to a network slice that the WCD is authorized to use; (2) a waiting module for waiting for a response; and (3) a determining module for determining that the authorized network slice is either not supported or is supported and barred if the WCD does not receive the response within a certain amount of time.

In another embodiment, the WCD comprises: (1) a first receiving module for receiving system information transmitted (e.g., broadcast) by an NE for informing the WCD that a particular set of one or more bits of a particular bit string corresponds to a particular network slice, which particular network slice is one of the WCD's authorized network slices; (2) a second receiving module for receiving the particular bit string, which may have been broadcast by the NE; (3) an examining module for examining the particular set of one or more bits of the bit string, which particular set of bits identifies a barring status of the particular network slice; and (4) a determining module for determining, based on the examination, whether or not the particular network slice is barred.

Advantages

An advantage of embodiments described herein is that they enable access control to the system to become network slice-aware, i.e. the network can protect its resources by for example only allowing WCDs belonging to specific network slice(s) to perform access. This could be useful to reduce the risk of signaling storms caused by MTC and/or Internet-of-Things (IoT) devices. Signaling storms are a well-feared issue in the area of IoT devices. For example, a large number of Internet enabled power meters located within a certain area that experienced a power failure may try to re-attach to the network at the same time (e.g., immediately after power is restored to the area), and, thereby, potentially cause an overload in the network, which could lead to a service outage. Embodiments described herein provide a WCD with knowledge of the network slices that are deployed in a certain area by adding network slice information to air interface signaling. In some embodiments, excessive signaling on the radio interface is reduced by coding and conveying the NSCI by mechanisms with less overhead.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

The overall principles of this disclosure work for, among other architectures, both an LTE-like architecture and a new architecture based on an evolution of the S1 interface.

Figure 1:
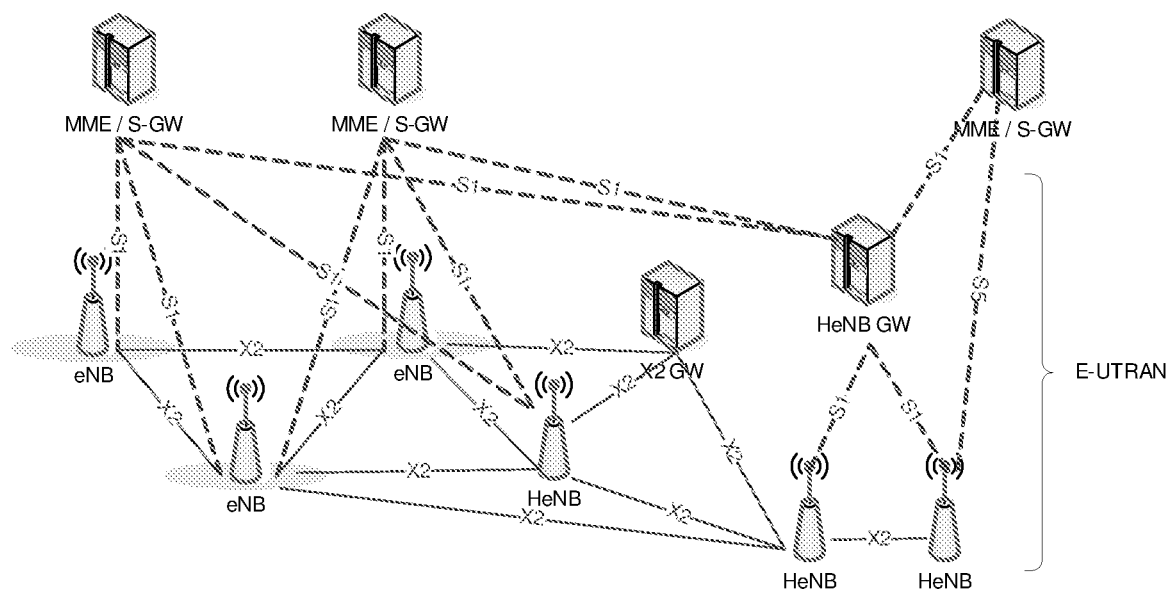
FIG. 1 illustrates the architecture of the LTE system.

1) LTE Architecture:

The third generation partnership project (3GPP) is currently working on standardization of Release 13 of the Long Term Evolution (LTE) concept. The architecture of the LTE system is shown in FIG. 1, including radio access nodes (eNBs, Home eNBs—HeNBs, HeNB GW) and evolved packet core nodes (MME/S-GW). As shown, an S1 interface connects HeNBs/eNBs to the MME/S-GW and HeNBs to the HeNB GW, while an X2 interface connects peer eNBs/HeNBs, optionally via an X2 GW.

Figure 2:
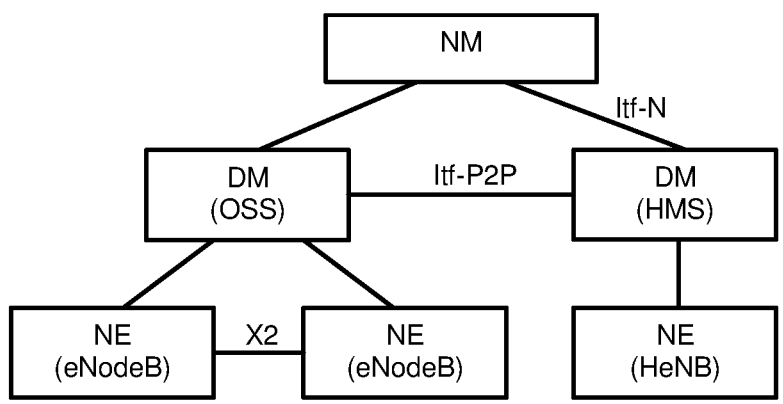
FIG. 2 illustrates an example management system architecture.

FIG. 2 illustrates an example management system. The node elements (NEs), also referred to as eNodeBs, are managed by a domain manager (DM), also referred to as the operation and support system (OSS). A DM may further be managed by a network manager (NM). Two NEs are interfaced by the X2 interface, whereas the interface between two DMs is referred to as Itf-P2P. The management system may configure the network elements, as well as receive observations associated to features in the network elements. For example, DM observes and configures NEs, while NM observes and configures DM, as well as NE via DM. By means of configuration via the DM, NM and related interfaces, functions over the X2 and 51 interfaces can be carried out in a coordinated way throughout the RAN, eventually involving the Core Network, i.e. Mobility Management Entity (MME) and Serving Gateways (S-GWs_.

2) LTE Architecture Evolution and 5G RAN Architecture:

It is not yet specified by 3GPP if and how the LTE architecture should evolve to meet the challenges of the 5G time frame. It is likely, however, that there will be evolved counterparts of the S1, X2 and Uu interfaces and that any new RAT would be integrated with the LTE radio interface at RAN level in a similar fashion as the way LTE Dual Connectivity is defined.

When it comes to the 5G RAN architecture, there could be novel interfaces (e.g. between some synchronous and asynchronous functionalities). Different discussions are ongoing in the industry about a possible future evolution of the current RAN architecture. From a starting point in a macro site based topology the introduction of low power cells, the evolution of the transport network between the different radio base station sites, the radio base station hardware evolution, the increased need for processing power and so on, have given rise to new challenges and opportunities. Several strong forces are at work on the RAN architecture, pulling in sometimes different directions. Some, like the gains of coordination, hardware pooling gains, energy saving gains and the evolution of the backhaul/fronthaul network are working in favor of a more centralized deployment while others are working towards de-centralization, such as very low latency requirements for some 5G use cases (e.g. mission critical Machine Type Communication (MTC) applications). The terms fronthaul and backhaul are used in relation to the base station. The traditional definition for fronthaul is the Common Public Radio Interface (CPRI) based fiber link between the baseband (Main Unit) and the Radio Unit. The backhaul refers to the transport network used for S1/X2-interfaces.

The recent evolution in backhaul/fronthaul has indeed opened up the possibility to centralize the baseband, often referred to as C-RAN. C-RAN is a term that can be interpreted in different ways. For some it means a "baseband hotel" like solutions in which the basebands from many sites are collocated to a central site but there is no tight connection and fast exchange of data between the sites. The most common interpretation is maybe "Centralized RAN" where there is at least some kind of coordination between the basebands. A potentially attractive solution is the smaller centralized RAN that is based on a macro base station and the lower power nodes covered by it. In this configuration a tight coordination between the macro and the low power nodes can often give considerable gains. The term "Coordinated RAN" is an often used interpretation that focuses on the coordination gains of the centralization. Other more futuristic interpretations of C-RAN include "cloud" based and "virtualized" RAN solutions where the radio Network functionality is supported on generic hardware (general purpose processors) and possibly as virtual machines.

A centralized deployment can be driven by one or several forces like e.g. a possible ease of maintenance, upgrade and less need for sites as well as harvesting of coordination gains. A common misconception is that there is a large pooling gain and a corresponding HW saving to be done by the centralization. The pooling gain is large over the first number of pooled cells but then diminishes quickly. One key advantage of having the basebands from a larger number of sites co-located and interconnected is the tight coordination that it allows. Examples of these are UL CoMP and combining several sector/carriers into one cell. The gains of these features can sometimes be significant in relation to the gains of looser coordination schemes such as e.g. eICIC that can be done over standard interfaces (X2) without co-location of the baseband.

An attractive C-RAN deployment from a coordination gain perspective is the C-RAN built around a larger macro site, normally with several frequency bands, and a number of lower power radios, covered by the macro site, that are tightly integrated into the macro over high-speed interconnect. The largest gains are expected to be seen in deployment scenarios such as stadiums and malls. An important consideration for any C-RAN deployment is the transport over the fronthaul, i.e. the connection between the centralized baseband part and the radios, "the first mile". The cost of the fronthaul, which vary rather greatly between markets, needs to be weighed against the benefits.

Figure 3:
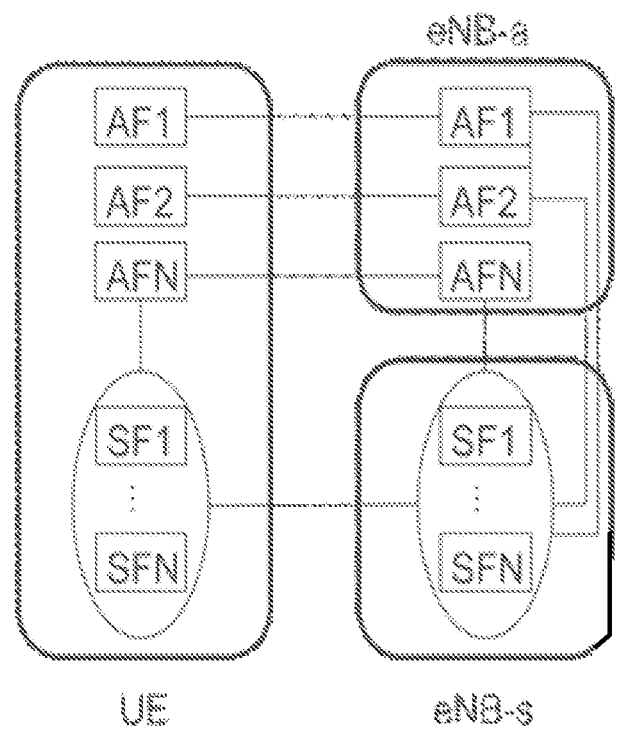
FIG. 3 illustrates grouped functions within a WCD and an eNB.

Future discussions in 3GPP may lead to a RAN functional split shown in FIG. 3. Therein, the RAN functions are classified in synchronous (placed in a logical node called eNB-s) and asynchronous (placed in a logical node called eNB-a) functions. The instances of functions associated to the eNB-s i.e. the synchronous functions (SFs) are placed at the closest node to the air interfaces. These will form what is called a synchronous functional group (SFG). Meanwhile, the instances of the asynchronous functions (AFs) associated to the eNB-a can be flexibly instantiated either at closest node to the air interface (i.e. the same node where the eNB-s functions are instantiated) or in other network nodes.

Figure 4:
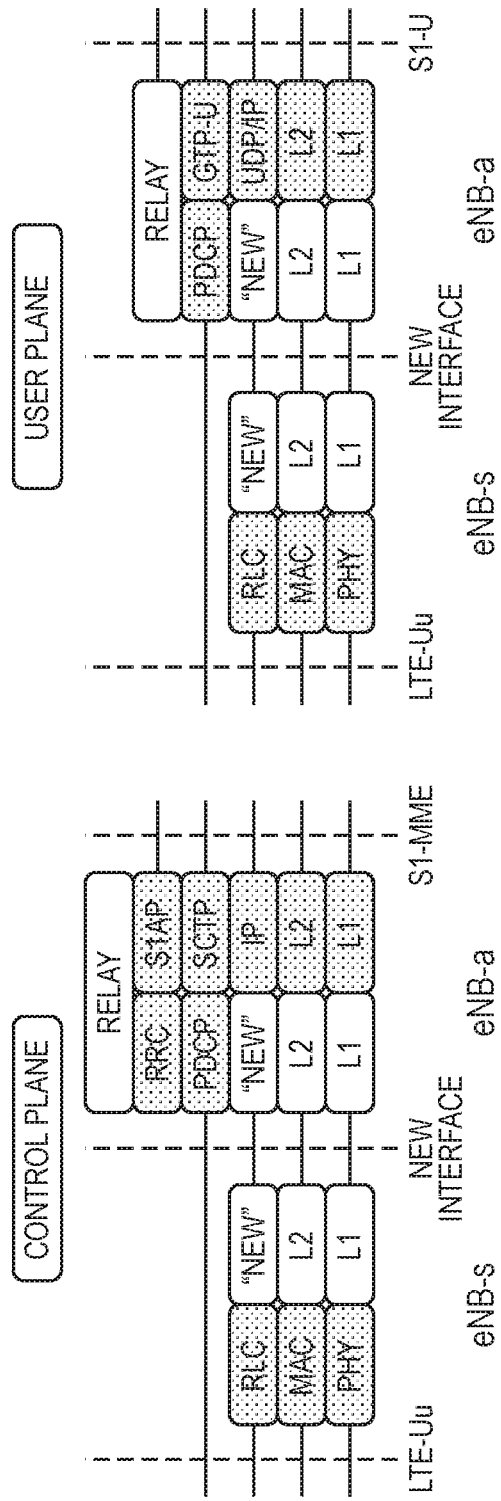
FIG. 4 illustrates a functional architecture of a user plane and a control plane.

Assuming the functions executed by E-UTRAN, the split would lead to the following functional architecture for the control plane and user respectively, as shown in FIG. 4.

Figure 5:
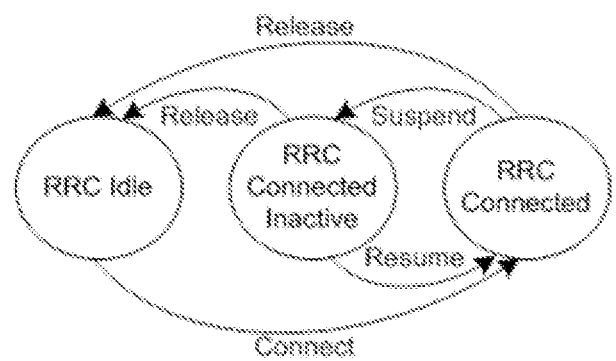
FIG. 5 illustrates an example WCD state diagram.

3) State Model for the 5G RAN:

A new state model may be proposed for the 5G architecture enabling an efficient WCD sleeping, a fast and lightweight transition from sleeping to active states and joint access optimizations. One likely model to be adopted is shown in FIG. 5.

The model consists of three states: "RRC Idle", "RRC Connected" and "RRC Connected Inactive". In the novel model the state transitions from RRC Idle to RRC Connected are expected to occur mainly during the first initial access (e.g. when the WCD attaches to the network) or as a fallback case (e.g. when the devices and/or network cannot use the previously stored RAN context). As a consequence, this transition is not expected to occur as often as in LTE.

On the other hand, transitions from "RRC Connected Inactive" to "RRC Connected" are expected to occur quite often and should be optimized as a lightweight and fast transition. The novel "RRC Connected Inactive" state designed to be used as the primary sleep state for the 5G access has as one of the characteristics the maintenance of context information by the WCD and the network when the WCD moves from "RRC Connected" to "RRC Connected Inactive". Some of these characteristics are currently being standardized by 3GPP, as some sort of novel RRC Idle mode behavior (see e.g., Cellular System Support for Ultra Low Complexity and Low Throughput Internet of Things; (Release 13)", 3GPP TR 45.820 v1.3.1 (2015 June)).

Therefore, when it comes to the WCD state model assumptions relevant for the present invention one can say the proposed access control enhancements may occur for 5G devices in RRC Idle in LTE (where this novel behavior can be considered) or in RRC Connected Inactive state (often called Dormant state) where the WCDs will keep parts of the WCD context when coming from RRC Connected.

4) System Information Distribution in 5G Via SCP Concept:

Energy efficiency is likely to be a rather important requirement in 5G. A considerable amount of energy is taken by reference signals and system information. In order to minimize the reference signals and system information, a solution with the following design principles could address the energy efficiency issue: (1) all nodes in the network do not need to broadcast the system information; (2) nodes transmitting system information may aggregate and transmit system information configurations (and indexes mapped to these configurations) from different nodes in the system. The aggregated system information is referred as Access Information Table—AIT. (These configurations (e.g. AIT) and their mapping indexes may be transmitted frequently (e.g. every few dozens of milliseconds) up to infrequently (e.g. every few seconds)); (3) each specific configuration (e.g. an entry in the AIT) contains essential information for 5G similar as the essential information in LTE which is contained in MIB/SIB1/SIB2; and (4) each node may transmit a system signature index (SSI) which is basically the index associated to a given configuration i.e. an entry in the AIT—(4a) an SSI may have similar properties and characteristics as the PSS/SS synchronization signals in LTE, (4b) a WCD detecting the SSI and having a valid stored AIT knows the essential system information to access that node, and (4c) SSI may be transmitted often (in the order of dozens to hundreds of milliseconds).

Figure 6:
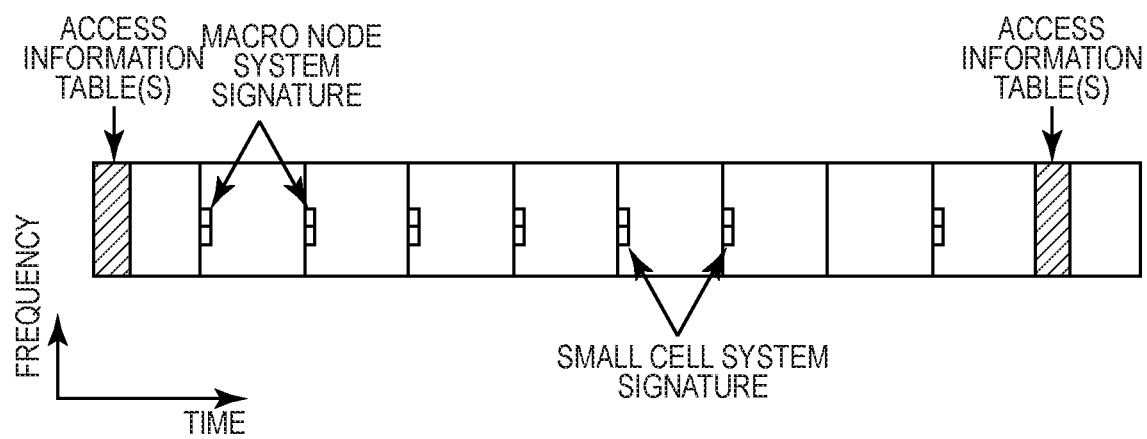
FIG. 6 illustrates the transmission of AITs and SSIs.

The idea aims to reduce the amount of broadcast information assuming that most of the time the WCD has access to the possible configurations (from an internally stored copy of a previously received AIT e.g. via dedicated signaling) and only use the broadcast indexes which can be called system signatures (i.e. SSIs) to point to the correct configuration for a given area. An example is shown in FIG. 6.

5) Network Slicing:

As discussed in the summary, network slicing is about creating logically separated partitions of the network, addressing different business purposes. These network slices are logically separated to a degree that they can be regarded and managed as networks of their own.

This is a new concept that applies to both LTE Evolution and new 5G RAT (in this document called NX). The key driver for introducing network slicing is business expansion, i.e. improving the cellular operator's ability to serve other industries, e.g., by offering connectivity services with different network characteristics (performance, security, robustness, and complexity).

Figure 7:
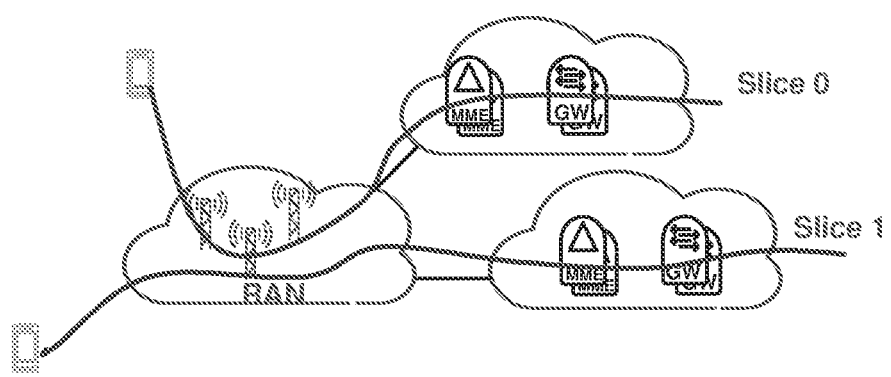
FIG. 7 illustrates a mobile network configured with two network slices.

The current working assumption is that there will be one shared Radio Access Network (RAN) infrastructure that will connect to several Core Network instances, such as Evolved Packet Core (EPC) instances (one EPC instance per network slice) or a further EPC evolution. As the CN functions (e.g. EPC functions) are being virtualized, it is assumed that the operator may instantiate a new Core Network (CN) when a new network slice should be supported. In another case the network slices could be implemented based on existing monolithic EPC architecture based on special purpose hardware. This architecture is shown in FIG. 7. Network slice 0 can for example be a Mobile Broadband network slice and Network slice 1 can for example be a Machine Type Communication network slice.

When it comes to one physical RAN used for multiple network slices, two aspects should be taken into account. The first aspect is that network slicing should make possible to support several different virtual networks on the same physical network infrastructure in order to reduce costs and energy consumption compared to deploying separate physical networks for the different use case or business scenarios. In order to fully exploit this benefit, it is required that the slicing concept allows for efficient usage of common resources such as radio resources and infrastructure, and transport links between the slices such as fronthaul and backhaul. The second aspect is that mechanisms are required to protect common channels or resources used for WCDs accessing system so that congestion in one network slice does not have a negative impact on another network slice (often called network slice isolation). Currently in 3GPP system there is some support for protecting common control channels for extensive load from different services. These mechanisms include Access Class Barring (ACB), Enhanced Access Barring (EAB), Service Specific Access Barring (SSAB), as well as implementation specific admission control etc. These are described below.

6) Access Control in LTE:

6.1) Access Class Barring (ACB)

ACB is used for access barring based on WCDs access class (AC), as follows: all WCDs randomly allocated to ACs between 0 and 9; AC permanently set by operator in the SIM of the device; AC 10 is for emergency calls; and AC 11-15 are used for high priority users (security services, utility . . . ).

Barring can be separately used for mobile originating data and calls and mapping of different NAS level procedures to these two types can be found in 3GPP TS 24.301; it is not possible to bar data but not e.g. VoLTE because SIP control messaging looks as normal PS data in AS and NAS layers. ACB was specified in 3GPP Rel-8.

When the eNB load threshold exceeds, the eNB can start to broadcast ACB parameters in SIB2: All WCDs need to be paged for SI update; and ACB takes place around 10 seconds after initiated.

Barring factor and timer broadcast: Factor (0 . . . 1) corresponds to barring probability; Timer determines how long WCDs are barred.

Barring behavior in the WCD (AC 0-9): The WCD draws a random number r. If this random number r is over the barring factor, the WCD is barred over a random timer; when timer expires, the WCD makes the barring test again and so on.

In 3GPP Release 12 the possibility of barring per PLMN was introduced, to support network sharing use cases.

There is also a special flavor of ACB covering CS Fallback (CSFB): it allows to down-prioritize (via barring) mobile-originating CSFB calls based on network information broadcast in SIB2 (ac-BarringForCSFB).

6.2) Service Specific Access Control (SSAC)

This feature was introduced in 3GPP Release 9 for WCDs in RRC_Idle state and in 3GPP Release 12 for WCDs in RRC_Connected state and it allows to down-prioritize (via barring) mobile-originating IMS voice and/or video calls based on NAS configuration and network information broadcast in SIB2.

6.3) Extended Access Barring (EAB)

In 3GPP Release 11, EAB was introduced. It allows operators to configure WCDs for EAB, for example in the WCD SIM. Typically devices that are configured for EAB are MTC and delay tolerant WCDs. It applies only for mobile-originating calls.

6.4) Smart Congestion Mitigation (ACB Skip)

ACB Skip was introduced in 3GPP Release 12, as a sort of reverse SSAC, meaning it allows WCDs appropriately configured by the NAS layer to skip ACB and by doing this it enables prioritization of mobile originating MMTEL video and/or voice and/or SMS. The type of service that can be prioritized is hardcoded in the standard (MMTEL voice, MMTEL video, SMS over SGs or SMS over IP or SMS over S102).

6.5) Application Specific Congestion Control for Data Communication (ACDC)

ACDC was introduced in 3GPP Release 13 and it provides the operator with some means to bar WCD access for certain application categories via information sent in system information, but requires also that WCDs are preconfigured with such categorization of applications.

Figure 8:
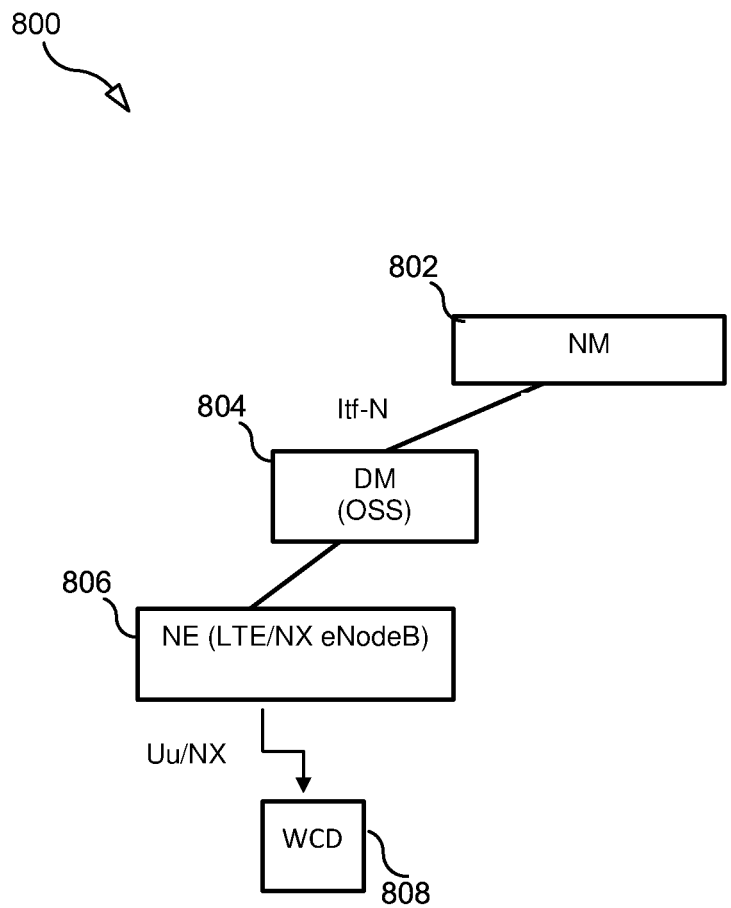
FIG. 8 illustrates a flow of network slice configuration information in an example management system.

Referring now to FIG. 8, FIG. 8 illustrates a system 800 according to some embodiments. In the example system shown in FIG. 8, an NM 802 provides configuration information to a DM 804, which provides configuration information to a node element (NE) (e.g., LTE/NX eNB) 806. The configuration information provided to NE 806 includes network slice information. In some embodiments, the network slice information includes information identifying the set of network slices supported by NE 806 and, for each supported network slice, a barring status (e.g., barring level). After NE 806 receives the configuration information, NE 806 transmits (e.g., broadcasts or unicasts) network slice configuration information (NSCI) so that it may be received by WCDs, such as WCD 808.

In some embodiments, the NSCI includes at least a portion of the network slice information received by NE 806 (i.e., information identifying a set of network slices supported by the NE and, for each supported network slice, a barring status). For example, NE 806 may provide service in two different cells (cell A and cell B), and the network slice information received by NE 806 may indicate that network slice 1 and network slice 2 are supported in cell A and network slice 1 and network slice 3 are supported in cell B. In such a scenario, NE 806 may transmit in cell A NSCI identifying network slices 1 and 2 and each network slice's barring status and transmit in cell B NSCI identifying network slices 1 and 3 and each network slice's barring status.

In some embodiments, the NSCI transmitted by NE 806 in a particular area (e.g., a particular cell) includes two lists: 1) a first list of network slice identifiers identifying all of the network slices supported in the cell and 2) a second list of network slice identifiers identifying only the supported network slices that are not barred (in the alternative the second list identifies only the supported network slices that are barred).

In some embodiments, the NSCI transmitted by NE 806 in a particular area includes a set data pairs, one for each network slice that is supported in the cell. Each such data pair consists of a network slice identifier for identifying a network slice and information identifying a barring status of the corresponding network slice (e.g., barred, unbarred, or barring level). In the cases wherein the information identifying the barring status identifies a barring level, the barring level may correspond to a specified WCD behavior. For example, a barring level of 1 may correspond to a WCD behavior in which the WCD waits X seconds before attempting to access the network following a failed access attempt, whereas a barring level of 9 may correspond to a WCD behavior in which the WCD waits Y seconds (Y>>X) before attempting to access the network following a failed access attempt.

In some embodiments, the network slice identifiers transmitted by NE 806 are hash values generated from the actual network slice identifiers. This embodiment is useful where the network operator does not expose publicly the network slices that are supported by the network.

In some embodiments, the NSCI transmitted by NE 806 identifies the supported network slices and corresponding barring status by comprising a set of pointers, wherein each pointer points to a data record (e.g., entry in a table) that includes a network slice identifier and a barring status value (e.g., a numeric value or other value). The only transmitted information is then such pointer value. For example, 3GPP may define X possible positions for network slice identifiers, e.g. 1 to 16, and for each of these the barring status may be either "barred" or "not barred" (e.g., 0 or 1). The operator configures the WCD 808 with a number of network slice identifiers and can make sure that the right network slice is defined at the right position in the network slice configuration (this way the WCD 808 knows for example which network slice occupies position 3 in the list). Then each unique instance of the network slice configuration is assigned a pointer. For example with 16 network slice positions and a binary barring status, we get 2^16 unique values of the network slice configuration, hence 65536 values of the network slice configuration pointer, which can be coded with 16 bits. This mechanism may not necessarily reduce signaling overhead (depending on the length of Slice IDs), but it does hide completely the information about Slice ID, which is locally defined in the network and in the UE, but not transmitted over the radio interface.

In some embodiments, the configuration information provided to NE 806 includes network slice information that includes information identifying a set of network slice groups, wherein each network slice group includes one or more network slices supported by NE 806 (for each network slice group, the network slice information may further include a barring status for the network slice group). For example, the network slices may be organized in a hierarchy so that network slices can be grouped in types that can be identified by a small amount of information (e.g., bits). For instance, a set of network slices having similar network slice characteristics can be identified by the same network slice group identifier. For example, a group of network slices for servicing MTC devices having similar/homogenous characteristics can be identified using a single network slice group identifier.

Signaling Mechanisms:

As discussed above, in order to inform a WCD (e.g., WCD 808, which may be an MTC device or other wireless communication device) of the network slices that are supported in a given area (e.g., cell), NE 806 signals this information in the cell. This can be done in a number of ways as described below.

In one embodiment, the NSCI is broadcast by NE 806. For example, as is known in the art, an LTE NE broadcasts System Information, such as a System Information Block (SIB). Accordingly, in some embodiments, NE 806 includes the NSCI in the SIB that it is configured to broadcast.

In another embodiment, part of the NSCI is conveyed to the WCD by broadcast signaling and part is conveyed by dedicated signaling. NE 806 can, for example provide a shorter list of supported and barred/unbarred network slice groups in system information broadcast, while the exact barred network slices within that group could be provided to the WCD during RRC connection establishment or immediately following it. For instance, a WCD is informed via system information broadcast that network slice group 1 is supported and not barred, so the WCD attempts to establish an RRC Connection for a particular network slice included within Group 1, during which the NE acquires information that the particular network slice the WCD seeks to access is actually overloaded and rejects or releases the WCD. This mechanism is less efficient than indicating the full network slice information to the WCD prior to WCD attempting to the network slice, but it has the advantage of decreasing the signaling overhead as less bits need to be broadcast. As another example, the WCDs in a cell are informed via system information broadcast that network slice group 2 is supported and barred (e.g., the identifier for network slice group 2 may be included in a list for identifying the barred groups). Hence, any WCD in the cell that receives this information and is configured to use a network slice included in network slice group 2 will not even attempt to gain access to the network slice.

In another embodiment, NE 806 provides barring information for a set of network slices (or a set of network slice groups) by transmitting a set of Access Information Tables (AITs), where each AIT corresponds to a different network slice, and transmitting an SSI (i.e., an index associated to a given entry in the AITs). NE 806 may transmit the set of AITs using dedicated signal or broadcast signaling. When a WCD configured to use a first network slice enters a given area (e.g., a given cell) its listen for the SSI that is transmitted (e.g., broadcast) in that area. When it receives the SSI, the WCD uses it to obtain from the AIT corresponding to the first network slice the configuration information stored in the AIT entry to which the SSI points. This configuration information may include information identifying the barring status for the first network slice. Likewise, another WCD that has entered the same area and that is configured to use a second network slice that is different than the first network slice also listens for the SSI transmitted in area and uses the SSI to obtain from the AIT corresponding to the second network slice the configuration information stored in the AIT entry to which the SSI points. In this way, a single SSI can be used provide barring status information for multiple network slices. In some embodiments, NE 806 broadcasts a partial AIT that contains the system information configurations needed for the initial access to the network and the remainder of the AIT (e.g. additional system information such as network slice barring status information) is provided to a WCD via dedicated signaling after the WCD accesses the network. By doing this, the network is capable of barring specific slices in specific areas (e.g., specific cells) by changing the SSIs that are being transmitted and relying on dedicated signaling for the AIT transmission where the same AIT (or parts of it) may be informed to devices belonging to the same network slice.

In another embodiment, NE 806 is configured to broadcast system information (e.g., an AIT) that, for each supported network slice, identifies a particular set of one or more bits in a bit string. The NE 806 is also configured to broadcast the bit string, wherein each set of bits in the bit string corresponds to one of the supported network slices and the bit (or bits) identifies the barring status of the corresponding network slice (e.g., whether the corresponding network slice is barred or unbarred). Thus, as one example, if a cell served by NE 806 supports three network slices (NSa, NSb, and NSc) where each network slice is either barred or unbarred, then NE 806 may broadcast in the cell an AIT that informs the WCDs in the cell that bit 1 of a particular 3 bit bit string corresponds to NSa, bit 2 of the particular bit string corresponds to NSb, and bit 3 of the particular bit string corresponds to NSc. Then, NE 806 will transmit the particular bit string such that each of the bits of the bit string identifies whether the corresponding network slice is barred or unbarred. For example, the bit string 010 can indicate that NSa and NSc are barred, but NSb is not barred. As another example, if a cell served by NE 806 supports three network slices (NSa, NSb, and NSc) where each network slice can have one of four possible barring levels, then NE 806 may broadcast in the cell an AIT that informs the WCDs in the cell that bits 1 and 2 of a particular 6 bit bit string corresponds to NSa, bits 3 and 4 of the particular bit string corresponds to NSb, and bits 5 and 6 of the particular bit string corresponds to NSc. Then, NE 806 will transmit the particular bit string such that each one of the three pairs of bits identifies the barring level of the corresponding network slice.

In another embodiment, each WCD is assigned, based on the network slice the WCD is configured to use, to use a specific random access channel (RACH) channel for requesting barring status information for the network slice. For example, the WCDs configured to use network slice 1 can be configured to use RACH channel 1, and the WCDs configured to use network slice 2, can be configured to use RACH channel 2. In the case NE 806 is not broadcasting the NSCI (e.g. for energy saving purposes), then the WCD uses the specific RACH channel assigned to it to transmit to NE 806 a request for the system information (e.g., barring status). Upon receiving the request, NE 806 broadcasts system information containing barring information depending on the RACH channel that has been accessed. That is, for example, upon receiving a barring status request transmitted via RACH channel 1, NE 806 broadcasts the barring status for network slice 1, and upon receiving a barring status request transmitted via RACH channel 2, NE 806 broadcasts the barring status for network slice 2. Thus, NE 806 may just broadcast the barring information. The WCD may be configured to interpret the absence of system information after request as the access barring for its network slice. Thus, if the WCD transmits the barring status request using the assigned RACH, but NE 806 does not respond to the request, then the WCD will interpret this silence as meaning that the corresponding network slice is barred, and, hence, the WCD will refrain from attempting to use the network slice (e.g. refrain from transmitting an RRC connection request).

Figure 9:
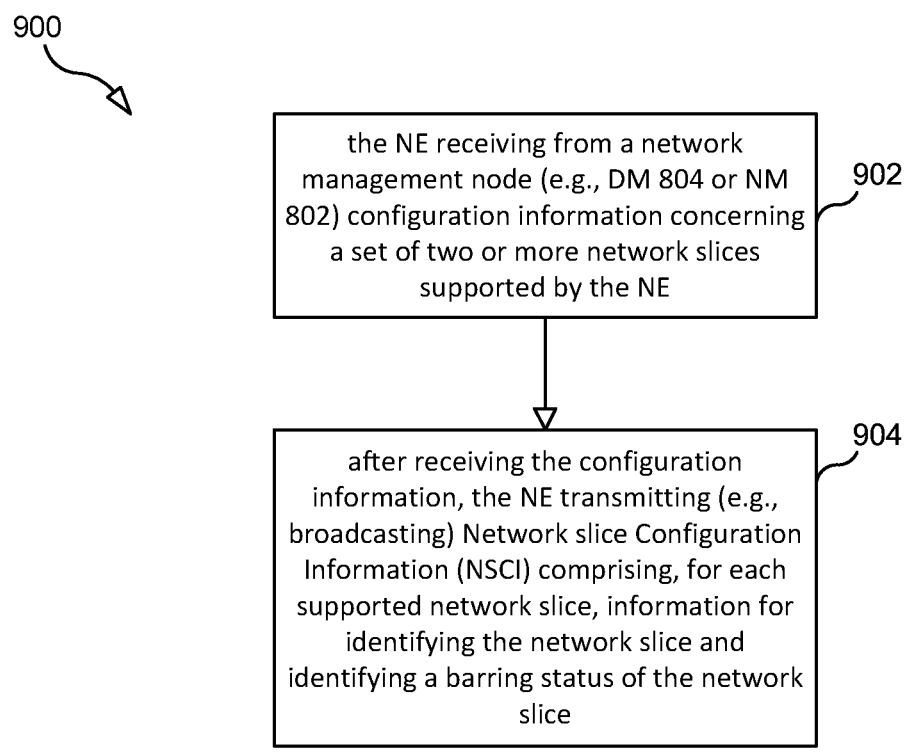
FIGS. 9-14 are flow diagram illustrating various processes according various embodiments.

FIG. 9 is a flow diagram illustrating a processes 900 according to an embodiment. Process 900 includes the steps of: (step 902) the NE 806 receiving from a network management node (e.g., DM 804 or NM 802) configuration information concerning a set of two or more network slices supported by the NE; and (step 904) after receiving the configuration information, the NE transmitting (e.g., broadcasting) network slice configuration information, NSCI, the NSCI comprising, for each supported network slice, information for identifying the network slice and information identifying a barring status of the network slice. In some embodiments, the NSCI comprises a first list identifying the set of supported network slices and a second list identifying the supported network slices that are barred. In another embodiment, the NSCI comprises a list identifying the set of supported network slices and further comprises, for each identified network slice, barring status information indicating the barring status of the network slice. In some embodiments, the barring status information indicating the barring status of the network slice identifies a barring level.

Figure 10:
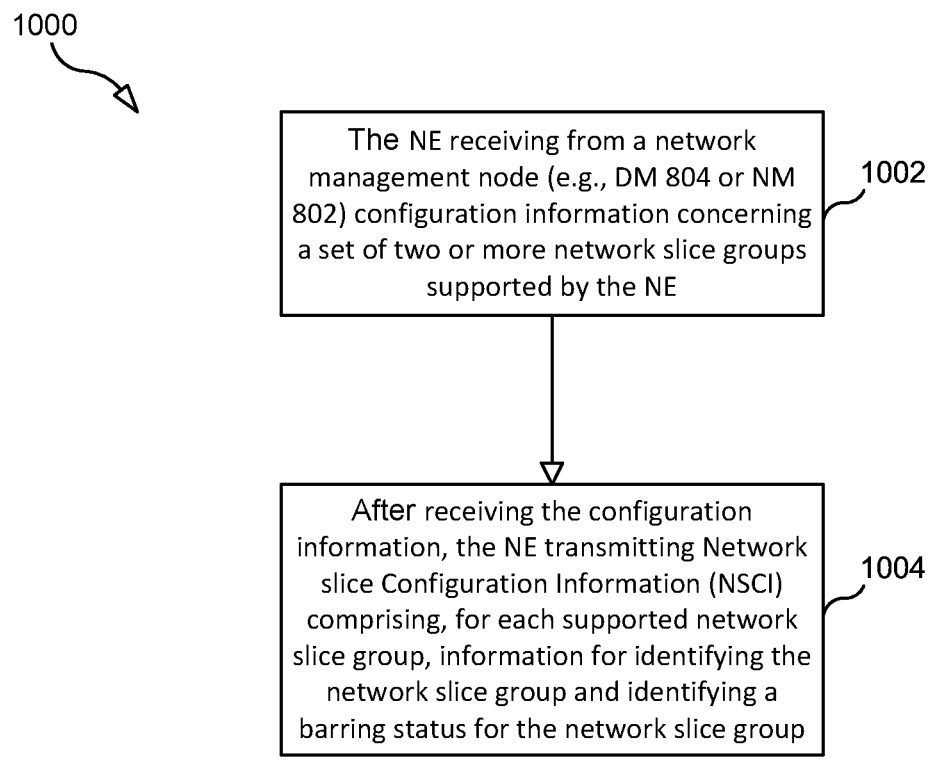

FIG. 10 is a flow diagram illustrating a processes 1000 according to an embodiment. Process 1000 includes the steps of: (step 1002) the NE 806 receiving from a network management node (e.g., DM 804 or NM 802) configuration information concerning a set of two or more network slice groups supported by the NE; and (step 1004) after receiving the configuration information, the NE transmitting (e.g., broadcasting) network slice configuration information, NSCI, the NSCI comprising, for each supported network slice group, information for identifying the network slice group and information identifying a barring status for the network slice group.

Figure 11:
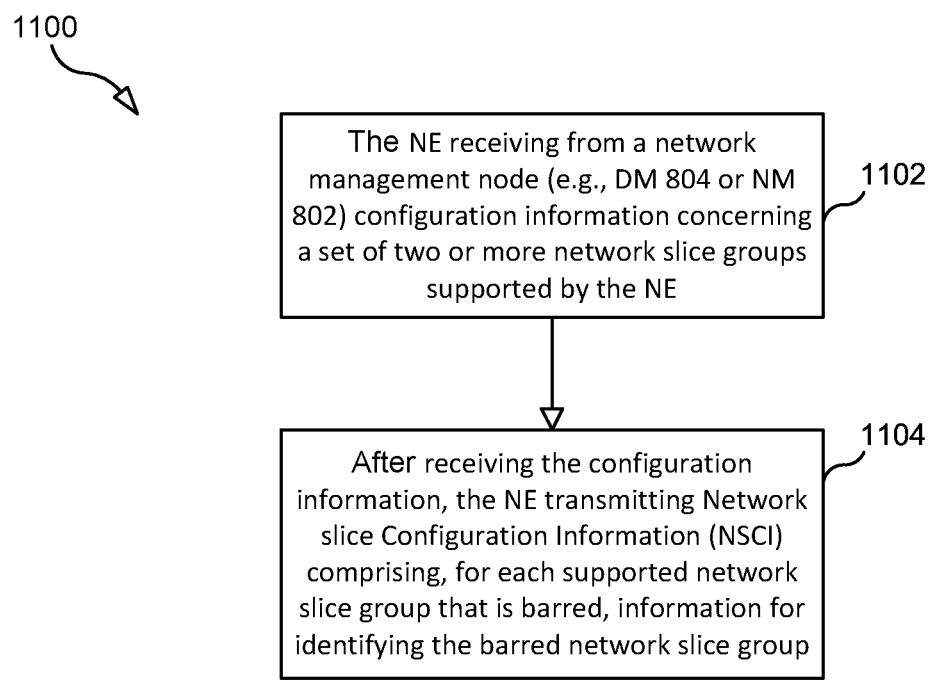

FIG. 11 is a flow diagram illustrating a processes 1100 according to an embodiment. Process 1100 includes the steps of: (1102) the NE 806 receiving from a network management node (e.g., DM 804 or NM 802) configuration information concerning a set of two or more network slice groups supported by the NE; and (1104) after receiving the configuration information, the NE transmitting (e.g., broadcasting) network slice configuration information, NSCI, the NSCI comprising, for each supported network slice group that is barred, information for identifying the barred network slice group.

Figure 12:
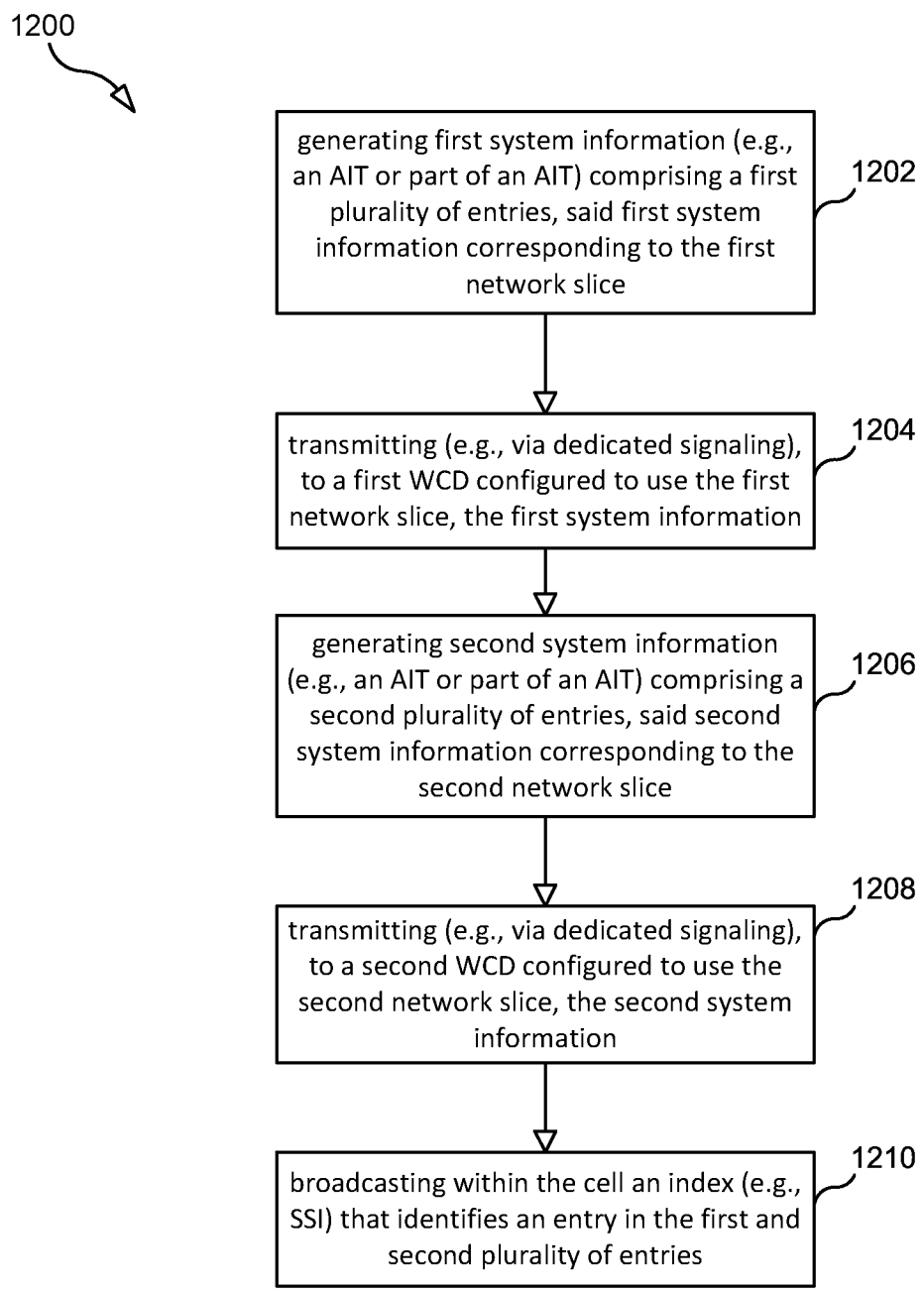

FIG. 12 is a flow diagram illustrating a processes 1200, according to an embodiment, that is performed by NE 806 for providing network slice information, wherein the NE serves a cell and supports at least a first network slice and a second network slice. Process 1200 includes the following steps:

Step 1202: generating first system information (e.g., an AIT or part of an AIT) comprising a first plurality of entries, the first system information corresponding to the first network slice (1202);

Step 1204: transmitting (e.g., via dedicated signaling), to a first WCD configured to use the first network slice, the first system information (1204);

Step 1206: generating second system information (e.g., an AIT or part of an AIT) comprising a second plurality of entries, the second system information corresponding to the second network slice (1206);

Step 1208 transmitting (e.g., via dedicated signaling), to a second WCD configured to use the second network slice, the second system information (1208); and Step 1210 broadcasting within the cell an index (e.g., SSI) that identifies an entry in the first and second plurality of entries (1210). The first WCD is configured to use the index to retrieve from the first plurality of entries the entry identified by the index, wherein the entry identifies a barring status (e.g., barring level) of the first network slice, and the second WCD is configured to use the index to retrieve from the second plurality of entries the entry identified by the index, wherein the entry identifies a barring status (e.g., barring level) of the second network slice.

Figure 13:
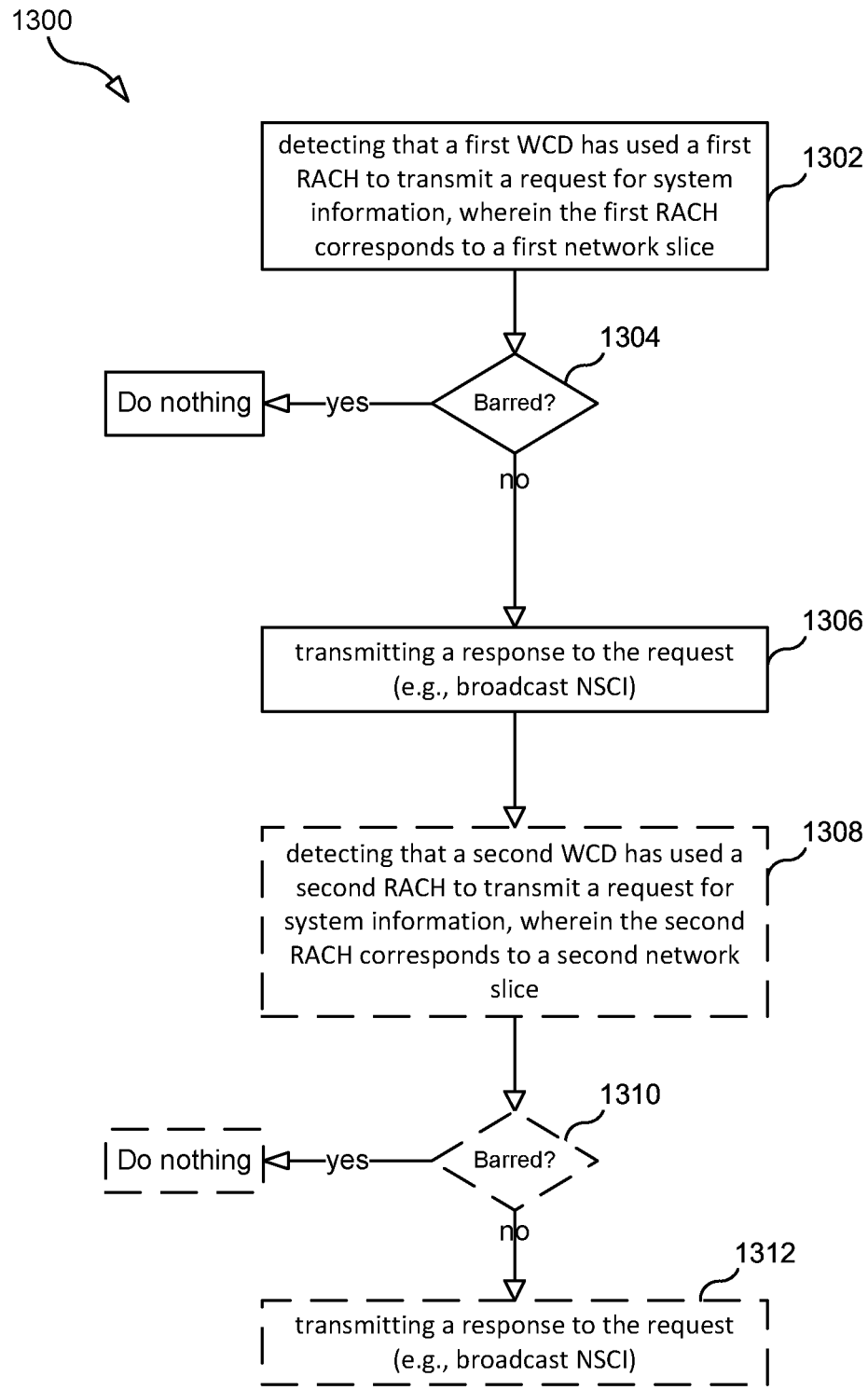

FIG. 13 is a flow diagram illustrating a processes 1300, according to an embodiment, performed by NE 806 for providing network slice information. Process 1300 includes detecting that a first WCD has used a first random access channel (RACH) to transmit a first request for system information, wherein the first RACH corresponds to a first network slice (step 1302). Process 1300 also includes, in response to detecting that the first WCD has used the first RACH to transmit the first request for system information, determining whether the first network slice is not barred (step 1304), and, as a result of determining that the first network slice is not barred, transmitting a response to the first request (step 1306) (e.g., broadcasting NSCI). Process 1300 may further include: detecting that a second WCD has used a second RACH to transmit a second request for system information, wherein the second RACH corresponds to a second network slice (step 1308), and, in response to detecting that the second WCD has used the second RACH to transmit the second request for system information, determining whether the second network slice is not barred (step 1310), and, as a result of determining that the second network slice is not barred, transmitting a response to the second request (step 1312) (e.g., broadcasting NSCI).

In some embodiments, transmitting a response to the first request includes broadcasting system information concerning the first network slice (e.g., information identifying a barring level of the first network slice) and transmitting a response to the second request includes broadcasting system information concerning the second network slice.

Figure 14:
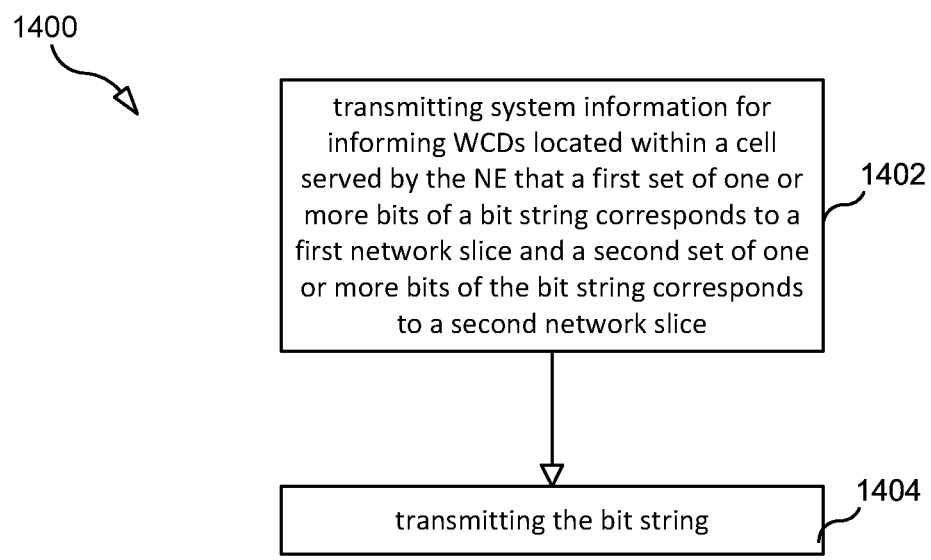

FIG. 14 is a flow diagram illustrating a processes 1400, according to an embodiment, performed by NE 806 for providing network slice information. Process 1400 includes the steps of: (step 1402) transmitting system information for informing WCDs located within a cell served by the NE that a first set of one or more bits of a bit string corresponds to a first network slice and a second set of one or more bits of the bit string corresponds to a second network slice; and (step 1404) transmitting the bit string (1404), wherein the first set of bits of the bit string identifies a barring status of the first network slice, the second set of bits of the bit string identifies a barring status of the second network slice, and the first set of bits is different than the second set of bits.

Figure 15:
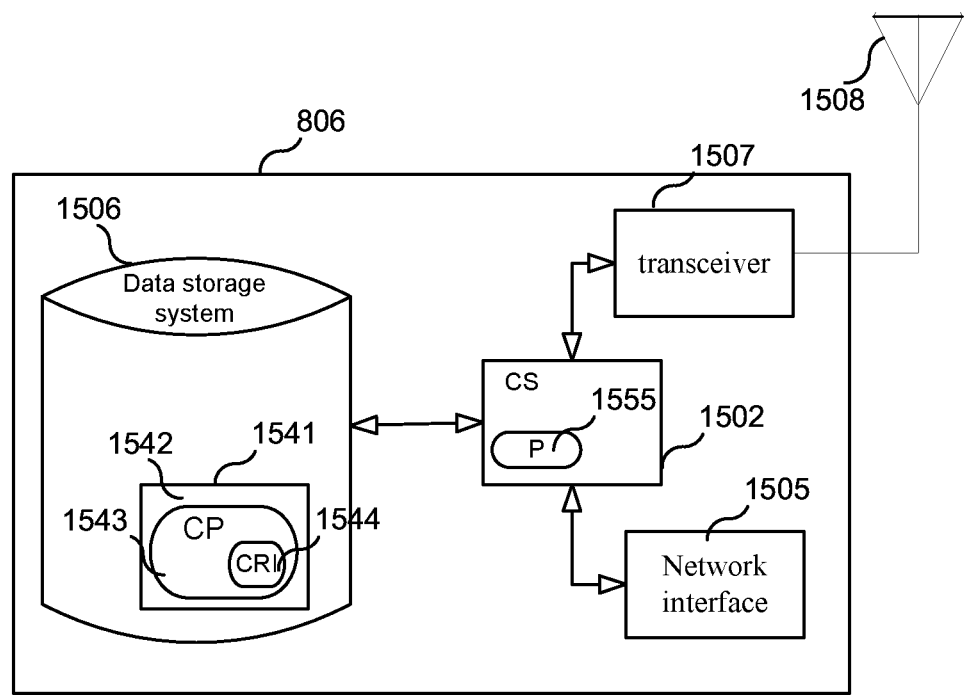
FIG. 15 is a block diagram of a network node according to some embodiments.

FIG. 15 is a block diagram of an embodiment of NE node 806. As shown in FIG. 15, NE 806 may include: a computer system (CS) 1502, which may include one or more processors 1555 (e.g., a general purpose microprocessor and/or one or more other data processing circuits, such as an application specific integrated circuit (ASIC), field-programmable gate arrays (FPGAs), and the like); a network interface 1505 for use in connecting the NE to a network and communicating with other units connected to the network; a transceiver 1507 coupled to an antenna 1508 for wirelessly communicating with WCDs; and a data storage system 1506 for storing information (e.g., network slice information received from network management node (e.g., NM or DM), which may include one or more non-volatile storage devices and/or one or more volatile storage devices (e.g., random access memory (RAM)). In embodiments where computer system 1502 includes a general purpose microprocessor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium (i.e., magnetic media (e.g., a hard disk), optical media (e.g., a DVD), flash memory, and the like). In some embodiments, the CRI 1544 of computer program 1543 is configured such that when executed by data processing system 1502, the CRI causes the computer system to perform steps described herein. In other embodiments, computer system 1502 may consist merely of one or more ASICs. Hence, the features of the embodiments described herein may be implemented in hardware and/or software.

WCD 808 Behavior:

In some embodiments, a network operator will configure its subscribers' WCDs with information identifying the network slice (or network slices) that the WCD is authorized to access. Accordingly, in such embodiments, when the WCD is put in use the WCD may first attempt to discover if an authorized network slice is supported and not barred in the area in which the WCD is located.

In one embodiment, the discovery process comprises the WCD searching for system information (e.g., a SIB) that is being broadcast by an NE serving the area; receiving the system information; and locating NSCI within the system information, wherein the NSCI identifies a set of supported network slices and the barring status of each supported network slice. The WCD then determines, based on the broadcast NSCI and its configuration information identifying the authorized network slices, whether any of the authorized network slices are supported and not barred. If the WCD determines that an authorized network slice is supported and not barred, then the WCD may attempt to initiate the establishment of an RRC connection with the NE (e.g., the WCD may transmit to the NE an RRC Connection Request, which request may be transmitted using a random access procedure). If the WCD determines, however, that none of its authorized network slices are supported or that all of its authorized network slices are barred, then the WCD will refrain from attempting to establish network access (e.g., refrain from initiating the random access procedure for the establishment of an RRC connection with the NE).

In another embodiment, the discovery process comprises the WCD searching for system information (e.g., a SIB) that is being broadcast by an NE serving the area; receiving the system information; and locating NSCI within the system information, wherein the NSCI identifies a set of supported network slice groups and the barring status of each supported network slice group. The WCD then determines, based on the broadcast NSCI and its configuration information identifying the authorized network slices, whether any of the authorized network slices are supported and not barred. For example, if each of the WCD's authorized network slices is a member of a barred network slice group, then the WCD will determine that all of its authorized network slices are barred. If the WCD determines that an authorized network slice is supported and not barred, then the WCD may attempt to initiate the establishment of an RRC connection with the NE (e.g., the WCD may transmit to the NE an RRC Connection Request as described above). If the WCD determines, however, that none of its authorized network slices are supported or that all of its authorized network slices are barred, then the WCD will refrain from attempting to establish network access (e.g., refrain from initiating the establishment of an RRC connection with the NE).

In another embodiment, the discovery process comprises the WCD receiving (e.g., via dedicated signaling) system information comprising a plurality of entries, wherein the system information corresponds to one of the WCD's authorized network slices. Next, the WCD receives an index (e.g., SSI) that identifies an entry in the plurality of entries. In some embodiments, the index is broadcast by an NE serving a cell in which the WCD is located. Next, the WCD uses the index to retrieve from the plurality of entries the entry identified by the index, wherein the retrieved entry identifies a barring status (e.g., barring level) of the authorized network slice. Based on the barring status information, the WCD determines whether the authorized network slice is barred. If the WCD determines that the authorized network slice is supported and not barred, then the WCD may attempt to initiate the establishment of an RRC connection with the NE.

In another embodiment, the discovery process comprises the WCD using a predetermined RACH to transmit a request for system information, wherein the predetermined RACH corresponds to the WCD's authorized network slice. After transmitting the request, the WCD waits for a response, which response may be a broadcast message. If the WCD does not receive the response within a certain amount of time, the WCD determines that the authorized network slice is either not supported or is supported and barred.

In another embodiment, the discovery process comprises the WCD receiving system information transmitted (e.g., broadcast) by an NE for informing the WCD that a particular set of one or more bits of a particular bit string corresponds to a particular network slice, which particular network slice is one of the WCD's authorized network slices. Next, the WCD receives the particular bit string, which may have been broadcast by the NE. Next, the WCD examines the particular set of one or more bits of the bit string, which particular set of bits identifies a barring status of the particular network slice. Based on the examination, the WCD determines whether or not the particular network slice is barred. If the particular network slice is not barred, then the WCD may attempt to initiate the establishment of an RRC connection with the NE.

Figure 16:
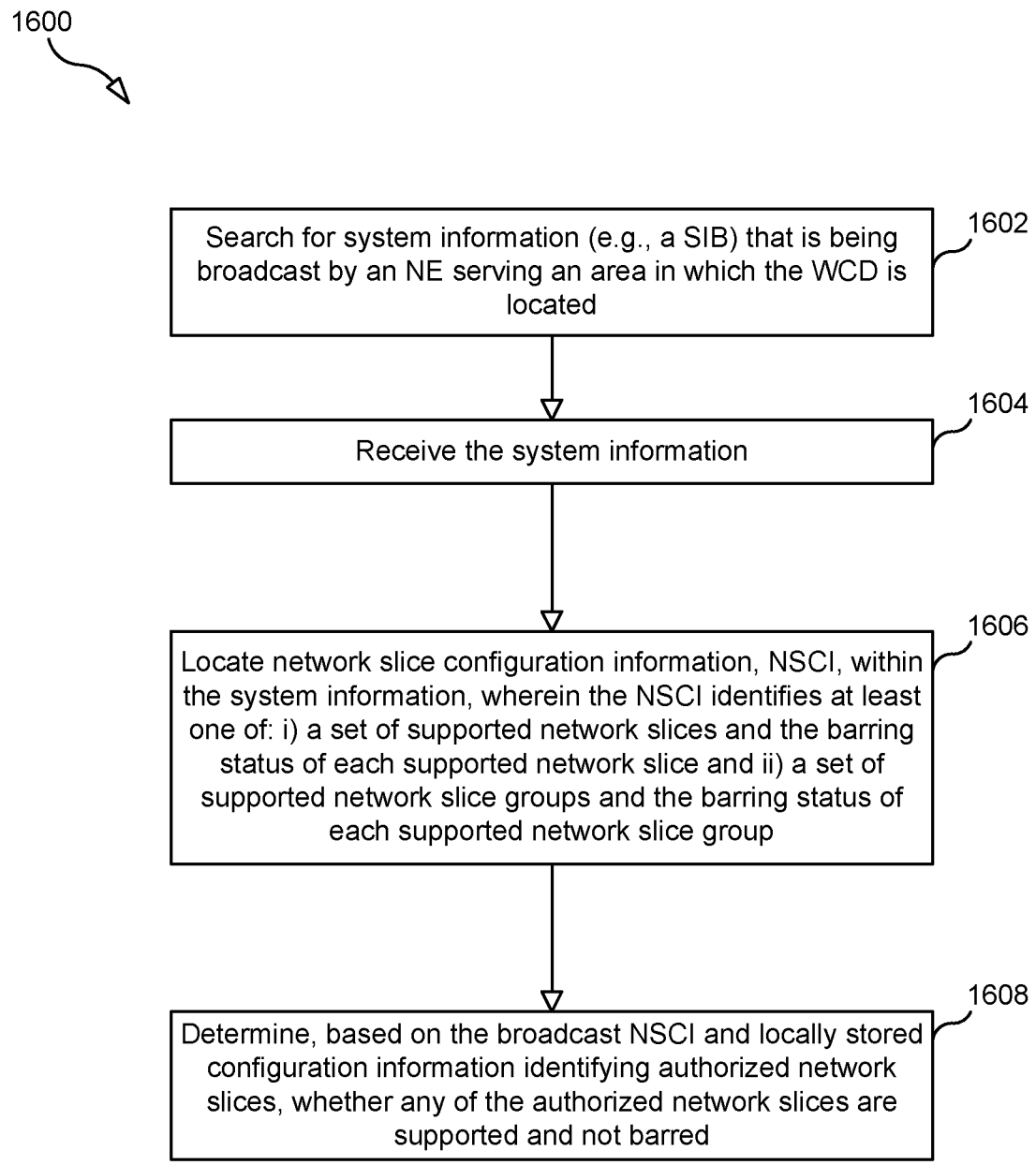
FIGS. 16-19 are flow diagram illustrating various processes according various embodiments.

FIG. 16 a flow diagram illustrating a process 1600, according to an embodiment, performed by WCD 808 for discovering whether a network slice that the WCD is authorized to use is supported and not barred. Process 1600 includes: (step 1602) the WCD searching for system information (e.g., a SIB) that is being broadcast by an NE serving an area in which the WCD is located; (step 1604) the WCD receiving the system information; (step 1606) the WCD locating network slice configuration information, NSCI, within the system information, wherein the NSCI identifies at least one of: i) a set of supported network slices and the barring status of each supported network slice and ii) a set of supported network slice groups and the barring status of each supported network slice group; and (step 1608) the WCD determining, based on the broadcast NSCI and locally stored configuration information identifying authorized network slices, whether any of the authorized network slices are supported and not barred.

In some embodiments, if the WCD determines that an authorized network slice is supported and not barred, then the WCD may attempt to initiate the establishment of an RRC connection with the NE (e.g., the WCD may transmit to the NE an RRC Connection Request), otherwise, if the WCD determines that none of its authorized network slices are supported or that all of its authorized network slices are barred, then the WCD will refrain from attempting to establish network access (e.g., refrain from initiating the establishment of an RRC connection with the NE).

Figure 17:
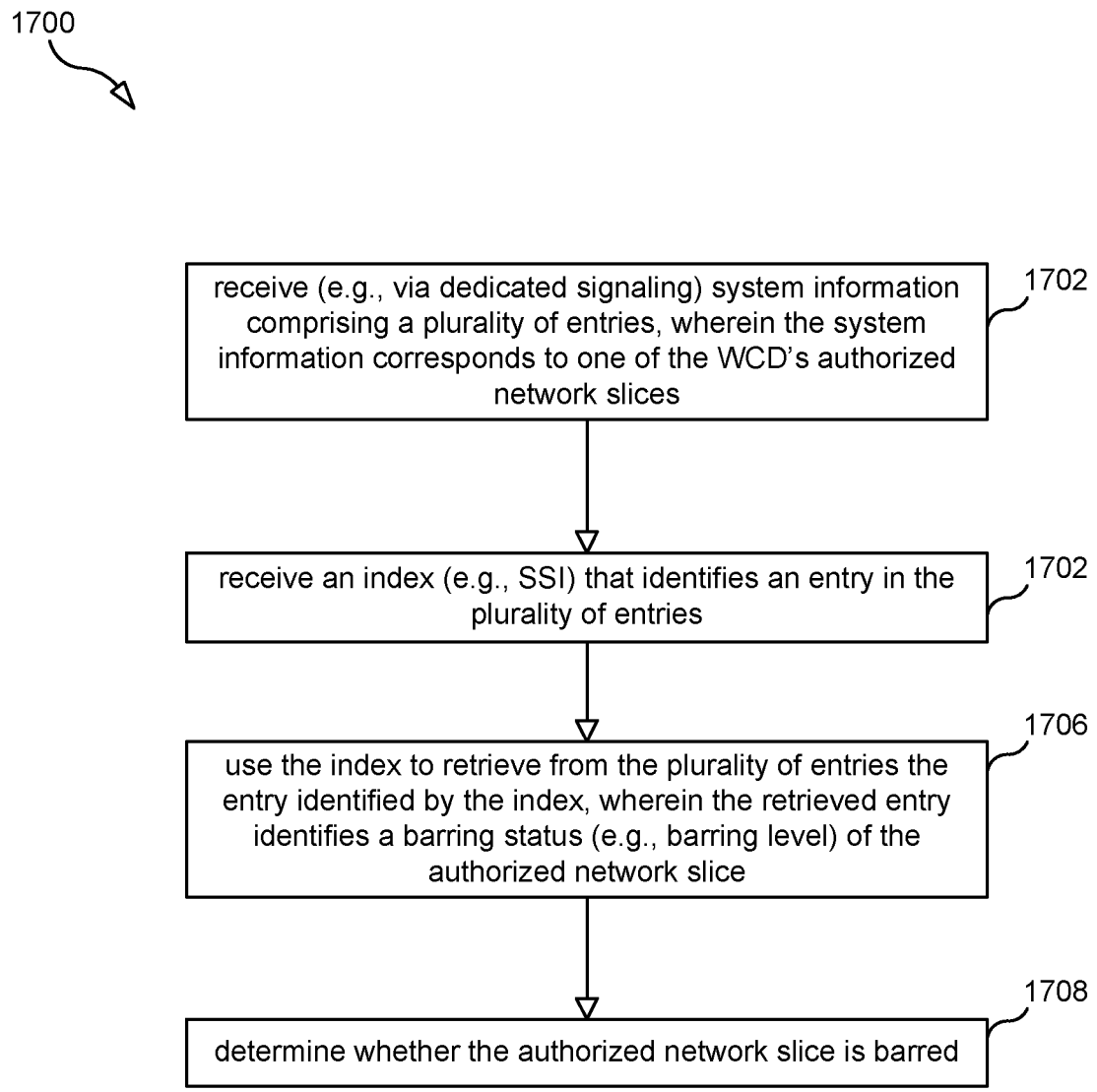

FIG. 17 a flow diagram illustrating a process 1700, according to an embodiment, performed by WCD 808 for discovering whether a network slice that the WCD is authorized to use is supported and not barred. Process 1700 includes: (step 1702) the WCD receiving (e.g., via dedicated signaling) system information comprising a plurality of entries, wherein the system information corresponds to one of the WCD's authorized network slices; (step 1704) the WCD receiving an index (e.g., SSI) that identifies an entry in the plurality of entries; (step 1706) the WCD using the index to retrieve from the plurality of entries the entry identified by the index, wherein the retrieved entry identifies a barring status (e.g., barring level) of the authorized network slice; and (step 1708) based on the barring status information, the WCD determines whether the authorized network slice is barred.

Figure 18:
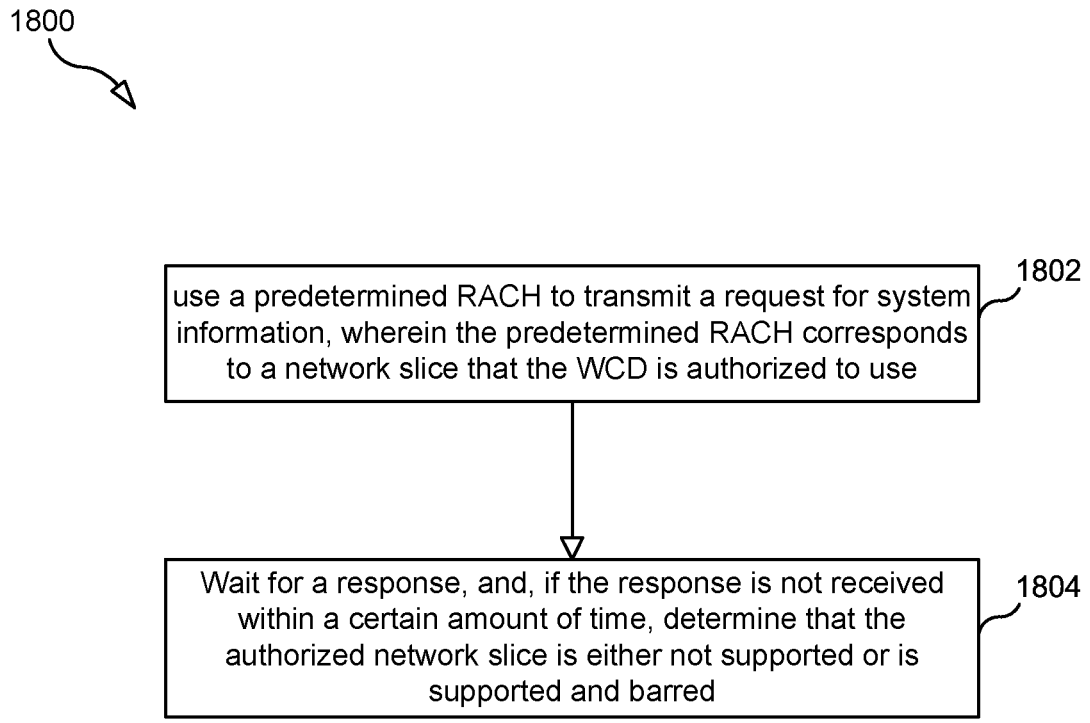

FIG. 18 a flow diagram illustrating a process 1800, according to an embodiment, performed by WCD 808 for discovering whether a network slice that the WCD is authorized to use is supported and not barred. Process 1800 includes: (step 1802) the WCD using a predetermined RACH to transmit a request for system information, wherein the predetermined RACH corresponds to a network slice that the WCD is authorized to use; (step 1804) after transmitting the request, the WCD waits for a response, which response may be a broadcast message, and, if the WCD does not receive the response within a certain amount of time, the WCD determines that the authorized network slice is either not supported or is supported and barred.

Figure 19:
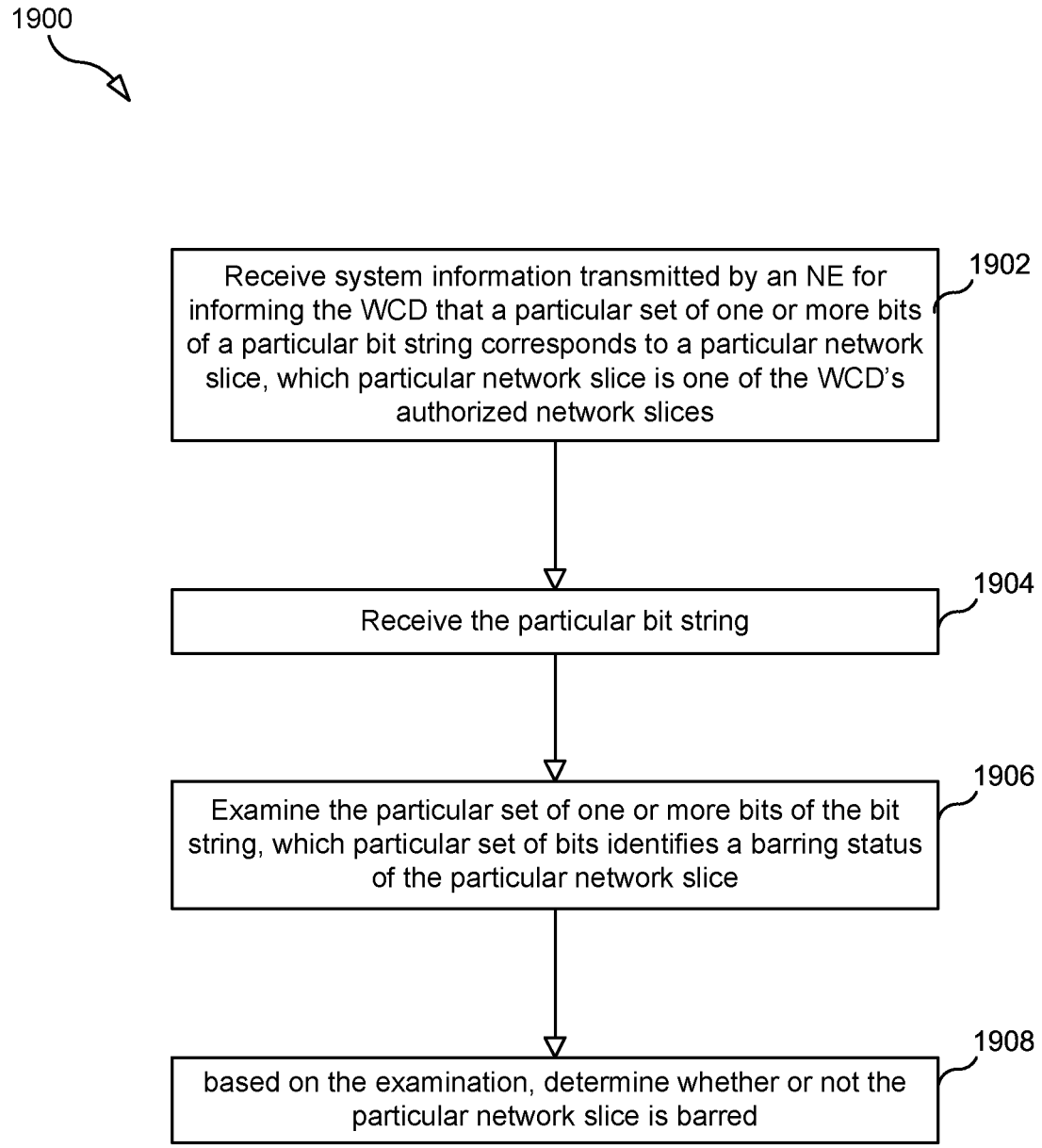

FIG. 19 a flow diagram illustrating a process 1900, according to an embodiment, performed by WCD 808 for discovering whether a network slice that the WCD is authorized to use is supported and not barred. Process 1900 includes: (step 1902) the WCD receiving system information transmitted (e.g., broadcast) by an NE for informing the WCD that a particular set of one or more bits of a particular bit string corresponds to a particular network slice, which particular network slice is one of the WCD's authorized network slices; (step 1904) the WCD receiving the particular bit string, which may have been broadcast by the NE; (step 1906) the WCD examining the particular set of one or more bits of the bit string, which particular set of bits identifies a barring status of the particular network slice; and (step 1908) based on the examination, the WCD determining whether or not the particular network slice is barred.

Figure 20:
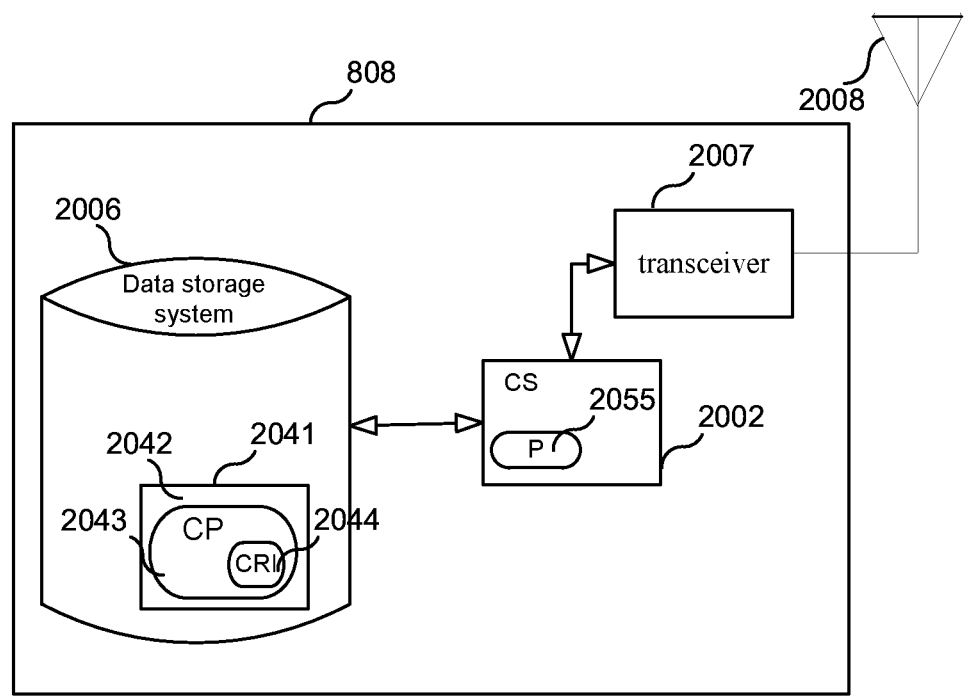
FIG. 20 is a block diagram of a WCD according to some embodiments.

FIG. 20 is a block diagram of an embodiment of WCD 808. As shown in FIG. 20, WCD 808 may include: a computer system (CS) 2002, which may include one or more processors 2055 (e.g., a general purpose microprocessor and/or one or more other data processing circuits, such as an application specific integrated circuit (ASIC), field-programmable gate arrays (FPGAs), and the like); a transceiver 2007 coupled to an antenna 2008 for wirelessly communicating with, among other nodes, NEs; and a data storage system 2006 for storing information (e.g., configuration information such as, for example, an AIT), which may include one or more non-volatile storage devices and/or one or more volatile storage devices (e.g., random access memory (RAM)). In embodiments where computer system 2002 includes a general purpose microprocessor, a computer program product (CPP) 2041 may be provided. CPP 2041 includes a computer readable medium (CRM) 2042 storing a computer program (CP) 2043 comprising computer readable instructions (CRI) 2044. CRM 2042 may be a non-transitory computer readable medium (i.e., magnetic media (e.g., a hard disk), optical media (e.g., a DVD), flash memory, RAM, ROM, and the like). In some embodiments, the CRI 2044 of computer program 2043 is configured such that when executed by data processing system 2002, the CRI causes the computer system to perform steps described herein. In other embodiments, computer system 2002 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, performed by a node element (NE), for providing network slice information, the method comprising:

the NE receiving, from a network management node, configuration information concerning at least one of:
i) a set of two or more network slices supported by the NE; and
ii) a set of two or more network slice groups supported by the NE; and after receiving the configuration information, the NE transmitting network slice configuration information (NSCI), the NSCI comprising at least one of:
i) for each supported network slice, information for identifying the network slice and information identifying a barring status of the network slice;
ii) for each supported network slice group, information for identifying the network slice group and information identifying a barring status for the network slice group; and
iii) for each supported network slice group that is barred, information for identifying the barred network slice group.

2. The method of claim 1, wherein the NSCI comprises a first list identifying the set of supported network slices and a second list identifying the supported network slices that are barred.

3. The method of claim 1, wherein the NSCI comprises a list identifying the set of supported network slices and, for each identified network slice, barring status information indicating the barring status of the network slice.

4. The method of claim 3, wherein the barring status information indicating the barring status of the network slice identifies a barring level.

5. A method, performed by a wireless communication device (WCD), for discovering whether a network slice that the WCD is authorized to use is supported and not barred, the method comprising:
    the WCD searching for system information that is being broadcast by an node element (NE) serving an area in which the WCD is located;
    the WCD receiving the system information;
    the WCD locating network slice configuration information (NSCI) within the system information, wherein the NSCI identifies at least one of:
        i) a set of supported network slices and the barring status of each supported network slice; and
        ii) a set of supported network slice groups and the barring status of each supported network slice group; and
    the WCD determining, based on the broadcast NSCI and locally stored configuration information identifying authorized network slices, whether any of the authorized network slices are supported and not barred.

6. The method of claim 5, wherein the WCD:
    attempts to initiate the establishment of an RRC connection with the NE responsive to determining that an authorized network slice is supported and not barred; and
    refrains from attempting to establish network access responsive to determining that none of its authorized network slices are supported or that all of its authorized network slices are barred.

7. A node element (NE) for providing network slice information, the NE comprising:
    processing circuitry;
    memory containing instructions executable by the processing circuitry whereby the NE is operative to:
        receive, from a network management node, configuration information concerning at least one of:
            i) a set of two or more network slices supported by the NE; and
            ii) a set of two or more network slice groups supported by the NE; and
        after receiving the configuration information, transmit network slice configuration information (NSCI), the NSCI comprising at least one of:
            i) for each supported network slice, information for identifying the network slice and information identifying a barring status of the network slice;
            ii) for each supported network slice group, information for identifying the network slice group and information identifying a barring status for the network slice group; and
            iii) for each supported network slice group that is barred, information for identifying the barred network slice group.

8. The NE of claim 7, wherein the NSCI comprises a first list identifying the set of supported network slices and a second list identifying the supported network slices that are barred.

9. The NE of claim 7, wherein the NSCI comprises a list identifying the set of supported network slices and, for each identified network slice, barring status information indicating the barring status of the network slice.

10. The NE of claim 9, wherein the barring status information indicating the barring status of the network slice identifies a barring level.

11. A wireless communication device (WCD) for discovering whether a network slice that the WCD is authorized to use is supported and not barred, the WCD comprising:
    processing circuitry;
    memory containing instructions executable by the processing circuitry whereby the WCD is operative to:
        search for system information that is being broadcast by an node element (NE) serving an area in which the WCD is located;
        receive the system information;
        locate network slice configuration information (NSCI) within the system information,
            wherein the NSCI identifies at least one of:
                i) a set of supported network slices and the barring status of each supported network slice; and
                ii) a set of supported network slice groups and the barring status of each supported network slice group; and
        determine, based on the broadcast NSCI and locally stored configuration information identifying authorized network slices, whether any of the authorized network slices are supported and not barred.

* * * * *